United States Patent [19]

Hermann et al.

[11] 3,749,375
[45] July 31, 1973

[54] PROCESS FOR MIXING, KNEADING AND GRANULATING THERMOSETTING PLASTIC MATERIAL IN CONTINUOUS OPERATION

[75] Inventors: Heinz Hermann, Stuttgart; Herbert Ocker, Leonberg, both of Germany

[73] Assignee: Werner & Pfleiderer, Stuttgart-Feuerbach, Germany

[22] Filed: Feb. 7, 1972

[21] Appl. No.: 224,087

[30] Foreign Application Priority Data
Feb. 19, 1971 Germany.................. P 21 07 927.6

[52] U.S. Cl. .............................................. 259/192
[51] Int. Cl. .............................................. B01f 7/08
[58] Field of Search................... 259/191, 192, 193, 259/9, 10, 25, 26; 425/209, 200, 202, 203

[56] References Cited
UNITED STATES PATENTS

| | | | |
|---|---|---|---|
| 3,085,288 | 4/1963 | Street.................................. | 259/192 |
| 3,193,877 | 7/1965 | Edwards ............................. | 259/191 |
| 3,407,438 | 10/1968 | Selbach.............................. | 259/192 |

Primary Examiner—Robert W. Jenkins
Attorney—Frederick E. Hane

[57] ABSTRACT

A process for mixing, kneading and granulating thermosetting plastic material in continuous operation resides in first feeding the material through a first mixing zone of a screw extruder. While the material passes through this zone it is mixed, homogenized, and also partly condensed. Before the material reaches a second mixing zone in the extruder an agent adapted to interrupt the condensation reaction in the material and to reduce the viscosity thereof is fed into the extruder. This agent is intimately intermingled with the material as the same passes through the second mixing zone thereby interrupting the condensation reaction and reducing the viscosity of the material. After passing through the second zone, the material is extruded through a perforated discharge plate at the end of the extruder and finally granulated by suitable cutting means disposed directly adjacent to the exit side of the perforated plate.

There is also disclosed an extruder arranged for carrying out the process of the invention.

4 Claims, 3 Drawing Figures

3,749,375

PROCESS FOR MIXING, KNEADING AND GRANULATING THERMOSETTING PLASTIC MATERIAL IN CONTINUOUS OPERATION

The invention relates to a process for kneading, mixing, and granulating thermosetting plastic material in a screw extruder in continuous operation. The invention further relates to a device for carrying out the process.

BACKGROUND

Processing of synthetic thermosetting plastic material such as phenolic resin for use as an intermediate product between processing of the chemical starting material and the utiliztion of the material in injecting or extruding devices involves basically the following process steps:

a. the preliminary mixing of raw resin or other starting material with fillers, for instance, wood flour, dyes, hardeners, lubricants and other suitable additives;

b. homogenization of the mixture within the micro range for which purpose the resin is melted and the additives are dispersed in the viscous plastic mass by suitable kneading and shear forces. The result of such treatment is a compacting of the mass of the synthetic plastic material;

c. the simultaneously induced condensation reaction which is assisted by increasing the pressure and the temperature. The condensation reaction must be carefully controlled and kept within narrow limits. If the condensation is carried too far it has an adverse effect upon the quality of the finished product as it is irreversible with thermosetting plastic material;

d. finally, the plastic material must be given a condition and form that is suitable for further processing of the material.

Further processing of plastic material in crushers, internal mixers or continuously operating kneaders is known. The material is discharged from such machines in the form of fragments of different sizes and shapes. These fragments must be subsequently cooled, further broken up and ground. The ground material must be sifted, and as a result of such sifting only a definite but limited portion of the ground material is obtained which is within the limits of the acceptable range of particle sizes. A further large portion of the material must be returned to the crushers, etc., thereby correspondingly reducing the economy of the operation. The rest of the material is obtained as powder or dust which must be returned to the device for premixing the starting materials; as a matter of experience, the powder or dust remainder is generally between 20 to 30 percent of the total quantity of the material. As a result of obtaining a substantial portion of the total quantity of the processed material in the form of pieces which are either too large or too small, the useful output obtained from processing the material in crushers, etc., is correspondingly reduced.

The dust component remaining in the processed material is also very undesirable. Such dust component tends to cause soiling of the various machines and devices that are used; it is unpleasant to service personnel and may even constitute a danger to health. Moreover, there is a considerable danger of dust explosions.

It is further known from the manufacture of thermoplastics to produce granules of uniform size in continuous operation with the processing of the material in a screw extruder. The synthetic plastic after having been melted and homogenized in a screw extruder is pressed out through a perforated plate and then immediately granulated by means of a suitable cutting device cutting the strands of material as they emerge from the perforated plate.

It has also been attempted to granulate thermosetting plastic material immediately following the processing of material in a screw extruder in a manner similar to that used in the processing of thermoplastics. In view of the present great economic importance of synthetic thermosetting plastic materials, it is readily understandable that the industry is very much interested in the development of a process for granulating synthetic thermosetting plastic material in the same continuous, convenient and economic manner in which synthetic thermoplastics can be granulated.

However, all the machines and methods heretofore suggested for the purpose are not a truly satisfactory solution of the problem. There are several difficulties inherent in the properties of thermosetting material. The flow resistance offered by the perforated discharge plate is too high for the highly viscous thermosetting plastic material. As a result, there is a heavy load built up at the extruder and aditional heating of the material. Such additional heating of the material causes a progressive and unacceptable hardening of the plastic material.

Thermosetting plastic material which is subjected to a too strong thermal loading results in an end product of inferior quality; the material may even become totally unsuitable for further processing. Moreover, the flow of the material within the extruder becomes irregular; there is a tendency of forming regions of stagnation within the extruder casings and the orifices or perforations in the perforated discharge plate tend to become clogged. It becomes necessary to stop the extruder after a comparatively short running time.

THE INVENTION

It is a broad object of the invention to provide a novel and improved process for producing thermosetting plastic material in an economically acceptable manner in the form of granules suitable for further processing the material in continuous operation, that is, without requiring an intermediate stage between the processing of the material in the extruder and the granulating of the material as was heretofore possible only for thermoplastics.

SUMMARY OF THE INVENTION

The aforepointed out objects, features and advantages, and other objects, features and advantages which will be pointed out hereinafter are obtained by providing a screw extruder, the casing of which has an inlet port at one end and a perforated discharge plate at the other end and which includes a first mixing zone adjacent to the feed end and a second mixing zone adjacent to the discharge end of the casing.

Thermosetting plastic material to be processed is fed into the extruder and as it passes through the first mixing zone therein it is melted, mixed and homogenized; it is also partly condensed and begins to harden. Between the downstream end of the first mixing zone and the upstream end of a second mixing zone an agent adapted to cause interruption of the condensation reaction of the material and reduction of the viscosity of the material is fed into the casing through a suitable feed port. This agent is intimately mixed with the material in the second mixing zone, thereby stopping the condensation reaction and reducing the viscosity of the material to a level at which th same can be granulated. Granulation is effected by means of a suitable and conventional cutting means which is disposed directly adjacent to the exit side of the perforated plate for cutting the strands of processed material extruded through this plate to uniform pieces of suitable size.

The condensation interrupting and viscosity lowering agent is added to the material in quantities ranging between 0.5 to 8 percent of the volume of the throughflow of the plastic material through the screw extruder; a percentage of 1 to 2 percent has been found to be particularly suitable.

Tests have shown that surprisingly the process of the invention can be carried out, at least for a number of types of thermosetting plastic material, by using water as agent for interrupting the condensation reaction and lowering the viscosity. Water produces the desired result to a high degree; it has no undesirable side effects on the plastic material to be processed, it can be easily removed from the material when it has served the purpose and, of course, is highly economical. As it is obvious, the selection of the agent must be made in accordance with the specific thermosetting plastic material to be processed. Suitable agents other than water are solutions or suspensions of resins in water.

The present invention made it possible for the first time to effect granulating of thermosetting plastic material in immediate sequence with the processing of the material as was heretofore possible only for thermoplastic material.

To sum up, the invention has, among others, the following advantages:

1. The grinding and sifting operations which were heretofore absolutely required, are eliminated, and thus also the complex and expensive equipment required for carrying out these operations.
2. The danger of dust explosions is removed; such explosions have frequently occurred during the grinding and sifting operations.
3. The useful output of the extruder is increased by about 20 percent since the corresponding quantity of sifted-out dust need not to be returned to the extruder for processing.
4. Th granules of plastic material do not disperse dust which is in marked contrast to the ground material as heretofore obtainable. Packaging and further processing of the plastic material can be carried out much more cleanly than heretofore possible.
5. The produced granules of the plastic material due to their substantially regular shape and size are much more suitable for accurate dosing and also for processing in extrusion molding machines than the heretofore available ground material consisting of particles which are highly irregular.

DETAILED DESCRIPTION OF THE INVENTION

In the accompanying drawing, several embodiments of a device suitable for carrying out th process of the invention are shown by way of illustration and not by way of limitation.

IN THE DRAWING

Figure 1:
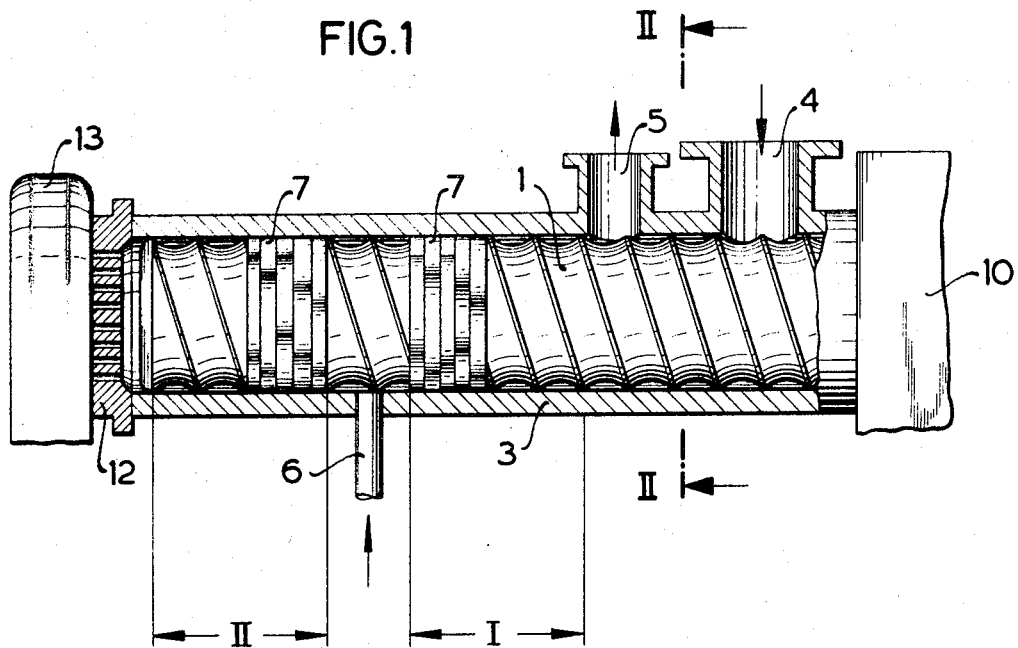
FIG. 1 is a lengthwise cross-section of a processing and granulating device according to the invention.
Figure 2:
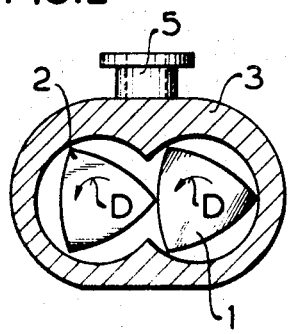
FIG. 2 is a cross-section taken on line A—A of FIG. 1.

Referring first to FIGS. 1 and 2, these figures show a twin-screw extruder with two parallel screws 1 and 2 which are in mesh and unidirectionally rotated. Arrows D indicate in FIG. 2 the rotational direction of the screws. Of course, a single-screw extruder can also be used for carrying out the process of the invention.

The screws are rotatably mounted in an elongate casing 3 which has at one end a feed port 4. If desired, a suitable and conventional metering device (not shown) may be connected to feed port 4. The other end of the casing is closed by a perforated or orificed plate 12 constituting a multiple discharge nozzle which is in direct coaction with a cutting or granulating device 13 which is only diagrammatically shown as it is presumed to be conventional.

The two screws may have along their entire length uniform screw flights or turns for conveying, kneading and mixing the material to be processed, but they may also include special kneading discs 7 as is shown. Kneading discs of this type are known in the art and are hence only diagrammatically indicated. The pitch of the screw flights or turns may vary along the length of the casing and it may be advisable to provide screw turns oriented in opposition to the conveying screw turns to effect a pressure buildup within the casing.

The screws in conjunction with the inner casing wall define a first mixing zone I adjacent to feed port 4 and a second mixing zone II adjacent ot the discharge end of the casing. The two zones are spaced apart and a feed duct or port 6 is provided intermediate the two mixing zones. This feed duct serves to feed into the casing downstream of the first mixing zone and upstream of the second mixing zone the aforedescribed agent for interrupting the condensation reaction started when the material passes through the first mixing zone and also for reducing the viscosity of the material.

As previously stated, water is a highly suitable agent for the processing of many types of thermosetting plastic materials such as phenolic resin. As also previously described, the material fed into the casing through port 4 is homogenized, mixed and kneaded when passing through the first mixing zone. It is partly condensed and has a viscosity that is too high for efficient granulation when it reaches the downstream end of zone I. The feed of the agent through duct 6 which is mixed with the material when the same passes through the second mixing zone stops the condensation and also reduces the viscosity of the material to a level such that it can be extruded through the perforations in plate 12 without danger of clogging the same. The material emerges from the plate in the form of strands which are of a consistency such that they can be conveniently chopped up to granules of a desired and uniform size in the cutting device 13.

The casing includes preferably one or more vent ports 5, one such port being shown.

The two screws are driven by suitable drive means diagrammatically indicated at 10, such as an electric motor coupled with the shafts of the screws by suitable and conventional gearings.

As previously stated, comparatively small quantities of the condensation interrupting and viscosity reducing agent are fed into the casing. As a result, most of the agent will have evaporated when the extrusion and granulation of the material are completed. If further drying of the material should be desirable, a drying trough can be coupled to the cutting device 13. If wet granulating should be used a special drying device is usually associated in the cutting or other granulating device.

Figure 3:
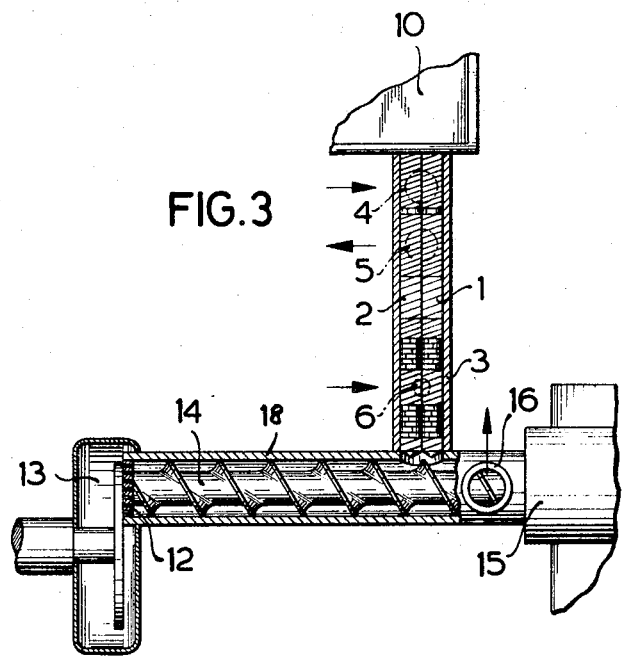
FIG. 3 is a plan view, partly in section, of a modification of the processing and granulating device of FIG. 1.

FIG. 3 shows a device for carrying out the process of the invention in two steps. There is shown a first screw extruder of the kind shown in FIG. 1, except that the perforated plate at the discharge end of the extruder is omitted; instead the first extruder communicates with the casing 18 of a second extruder. This second extruder may be either a single-screw extruder or a twin-screw extruder. There is shown an extruder screw 14 which serves to convey the material fed from th first extruder into the second extruder toward the discharge end of the second extruder. This discharge end is closed by the aforedescribed perforated plate 12 which is, as also previously described, in direct coaction with the cutting or granulating device 13.

One or more vent ports 16 may be provided. One of these vent ports is shown to be located closely adjacent to the feed end of the second extruder for removing at least part of the agent fed into the first extruder through duct 6 as described.

The screw of the second extruder is driven by a diagrammatically shown drive means 15. This second drive means is arranged to drive screw 14 at a lower rpm than screws 1 and 2 of the first extruder are driven by drive means 10. As a result of the slower conveying speed of thematerial in the second extruder, the material while passing through the same is further processed in a particularly gentle manner.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A process for mixing, kneading and granulating thermosetting plastic material in continuous operation, said process comprising the steps of:

providing a screw extruder having a casing with an inlet port at one end and a perforated discharge plate at the other end, said casing including a first mixing zone adjacent to the feed end and a second mixing zone adjacent to the discharge end of the casing and further providing granulating means in direct coaction with said plate;

conveying thermosetting plastic material fed into the casing through the inlet port thereof through the first mixing zone by operation of the screw extruder, passage of the material through said first zone melting, mixing, kneading, homogenizing and partly condensing the material;

feeding a condensation reaction interrupting and viscosity reducing agent into the casing at a point downstream of the first mixing zone and upstream of the second mixing zone;

then conveying material through the second mixing zone for mixing the material with said agent, the action of said agent interrupting the condensation reaction in the material and reducing the viscosity thereof; and finally extruding the material through said perforated plate and granulating the extruded material.

2. The process according to claim 1 wherein the said condensation reaction interrupting and viscosity reducing agent are fed into the casing at the rate of 0.5 to 8 volume percent relative to the outflow of the thermosetting plastic material through said discharge plate of the extruder.

3. The process according to claim 2 wherein 1 to 2 volume percent of the agent are fed into the casing.

4. The process according to claim 1 wherein said agent is water.

* * * * *